United States Patent
Por et al.

(10) Patent No.: US 8,510,583 B2
(45) Date of Patent: Aug. 13, 2013

(54) ASYNCHRONOUS SLEEP MODE FOR HOST CONTROLLER

(75) Inventors: Choon Gun Por, Georgetown (MY); Karthi R. Vadivelu, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 368 days.

(21) Appl. No.: 12/917,795

(22) Filed: Nov. 2, 2010

(65) Prior Publication Data

US 2012/0005508 A1     Jan. 5, 2012

(30) Foreign Application Priority Data

Jul. 1, 2010   (MY) .......................... PI 2010003132

(51) Int. Cl.
*G06F 1/32*     (2006.01)

(52) U.S. Cl.
USPC ........... 713/323; 713/300; 713/320; 713/322; 713/324

(58) Field of Classification Search
USPC .......................... 713/300, 320, 322, 323, 324
See application file for complete search history.

(56) References Cited

U.S. PATENT DOCUMENTS

| | | | |
|---|---|---|---|
| 2002/0138776 A1* | 9/2002 | Cohen et al. ................... | 713/320 |
| 2003/0014677 A1* | 1/2003 | Howard et al. ............... | 713/323 |
| 2006/0248364 A1* | 11/2006 | Gutman et al. ............... | 713/300 |
| 2007/0113114 A1* | 5/2007 | Tang .............................. | 713/323 |
| 2007/0140199 A1* | 6/2007 | Zhao et al. .................... | 370/338 |
| 2007/0162773 A1* | 7/2007 | Krantz et al. ................. | 713/300 |
| 2008/0028113 A1* | 1/2008 | Guo et al. ...................... | 710/104 |
| 2008/0244109 A1* | 10/2008 | Lee et al. ......................... | 710/19 |
| 2009/0216981 A1* | 8/2009 | Diefenbaugh et al. ........ | 711/163 |
| 2009/0254771 A1* | 10/2009 | So et al. ......................... | 713/323 |
| 2010/0070642 A1* | 3/2010 | Bansal et al. ................. | 709/230 |
| 2010/0191995 A1* | 7/2010 | Levy et al. .................... | 713/323 |

* cited by examiner

*Primary Examiner* — Vincent Tran
(74) *Attorney, Agent, or Firm* — Blakely, Sokoloff, Taylor & Zafman LLP

(57) ABSTRACT

Embodiments of the invention utilize a universal serial bus (USB) host controller to traverse an asynchronous data transfer list to identify data transfers to execute. The asynchronous data transfer list may include a plurality of header nodes, each header node to identify data transfers to one of a plurality of devices operatively coupled to an electronic device. The USB host controller may execute an extended sleep mode in response to identifying no data transfers to execute and receiving an indication that the system processor is in a sleep state. The USB host controller may exit the extended sleep mode in response to receiving an indication that the processor is in non-sleep state.

16 Claims, 4 Drawing Sheets

ASYNCHRONOUS SLEEP MODE FOR HOST CONTROLLER

PRIORITY

This application claims priority to Malaysian Patent Application No. PI2010003132, filed on Jul. 1, 2010.

FIELD

Embodiments of the invention generally pertain to electronic devices, and more particularly, to managing system power consumption.

BACKGROUND

Electronic devices such as computers are often interconnected to peripheral devices (e.g., input/output (I/O) devices, memory devices, printers). A Universal Serial Bus (USB) is often used to communicate data between a host processor of an electronic device and peripheral devices.

A USB host controller manages the transfer of data over the USB. A Host Control Interface (HCI) is a register level interface that allows for USB hardware to communicate with a host controller driver of an electronic device. Enhanced Host Controller Interface (EHCI) is a high speed USB host controller standard. The EHCI provides support for two categories of data transfer types: periodic and asynchronous.

Asynchronous data transfers typically involve the transfer of large amounts of data at variable times using any available bandwidth; however bandwidth and latency limits are not guaranteed. Asynchronous data transfers are typically not time sensitive, but must be delivered (in contrast to periodic data transfers, such as isochronous data transfers, that are time sensitive but do not necessarily need to be delivered). Asynchronous data transfers involve accessing an asynchronous schedule stored in main memory, which is a circular linked list of schedule work items used to provide round-robin service opportunity for asynchronous data transfers.

Power management of electronic devices is becoming more of a concern due to the implementation of battery powered mobile system platforms. While a USB is quite effective at moving large amounts of data very quickly, current implementations of USB host controllers are relatively inefficient with respect to power consumption.

When the asynchronous schedule is empty, the EHCI standard calls for a 10 μs sleep mode to avoid unnecessarily occupying too much memory bandwidth. This solution does not address the power implication of continually spinning through the asynchronous schedule in system memory, and occasionally pausing for a period of 10 μs before resuming regular operation. This behavior may prevent the processor of an electronic device from entering a deeper sleep state. For example, a processor sleep state may have an associated "exit latency" (i.e., a time value indicating how long it takes for processor to exit the respective sleep state). Scheduled accesses to the asynchronous schedule every 10 μs would not permit the processor to enter a sleep state if the associated exit latency is greater than 10 μs. Thus, the current EHCI standard may cause the processor along with its memory sub-system to burn significant power at the system level.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as a discussion of other potential embodiments or implementations of the inventive concepts presented herein. An overview of embodiments of the invention is provided below, followed by a more detailed description with reference to the drawings.

DESCRIPTION

Embodiments of the invention are directed towards reducing system power consumption by preventing unnecessary memory accesses by a system host controller asynchronous engine when an asynchronous data transfer schedule list is empty. Unnecessary memory accesses are prevented by executing an extended sleep mode for the system host controller. Entry to and exit from this extended sleep mode may be tied to a sleep state of the system processor. Once an empty asynchronous data transfer schedule has been detected, and the system processor has entered into a sleep state (e.g., C2 or deeper C-state as defined by the Advanced Configuration and Power Interface (ACPI) standard, revision 4.0, published Jun. 16, 2009), then the extended sleep mode may be executed for the system host controller.

Embodiments of the invention may be utilized by a system including a Universal Serial Bus (USB) (Universal Serial Bus Revision 3.0, published Nov. 12, 2008) operatively coupling a processor, main memory and a plurality of devices. The exchange of data between these components may be managed via a host controller. The host controller may traverse an asynchronous data transfer list to identify data transfers to execute. The asynchronous data transfer list may include a plurality of header nodes (i.e., queue heads), where each header node identifies data transfers to be executed to one of the plurality of devices. It is to be understood that a device may have more than one header node (e.g., a device may have separate header nodes for read operations, write operations and control operations).

The host controller may execute the extended sleep mode in response to identifying no asynchronous data transfers to execute and receiving an indication that the processor is in a sleep state. The host controller may exit the extended sleep mode for the host controller in response to receiving an indication that the processor is no longer in the sleep state.

Figure 1:
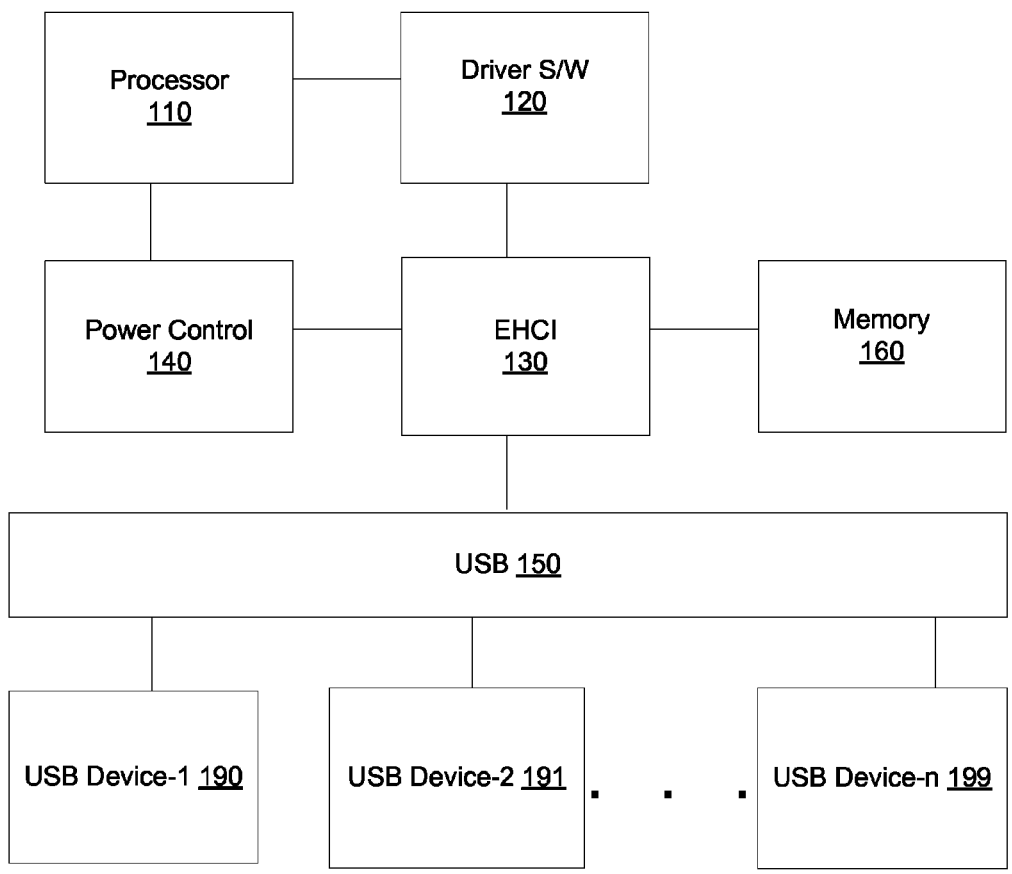
FIG. 1 is a block diagram of a system including an embodiment of an invention.

FIG. 1 is a block diagram of a system utilizing an embodiment of the invention. System 100 may be included in a desktop computer device, a mobile computer device, or any other any device utilizing a processor and a USB.

System 100 includes processor 110, which may operate in operational states including at least an active state and a low-power sleep state. The operational state of processor 100 may be determined by power control 140. Conditions such as processor workload, system idle time and power supply conditions may be used by power control 140 to determine the operational state of processor 110.

System 100 further includes system memory 160, USB 150 and USB devices 190-199. USB 150 may be used to communicate data between processor 110 and a peripheral device. Each of USB devices 190-199 may be any USB peripheral device, such as an input/output device, a memory device, or a printer.

System 100 further includes an Enhanced Host Controller Interface (EHCI) (Enhanced Host Controller Interface Specification for Universal Serial Bus, revision 1.0, published Mar. 12, 2002; 1.1 addendum published August 2008) implementation of a USB host controller (herein referred to as EHCI), 130. EHCI 130 manages USB data transfers to and from system memory 160 and USB devices 190-199. EHCI 130 may include routing logic (e.g., USB ports) used to deliver data to or from a peripheral device.

Processor 110 may execute driver software 120. Driver software 120 may abstract the hardware details of EHCI 130 and USB devices 190-199 for an operating system executed via processor 110.

Data may be transferred on USB 150 in an isochronous or asynchronous manner. Isochronous transfers are serviced according to a periodic schedule stored in system memory 160. Asynchronous transfers are serviced according to an asynchronous schedule that is also stored in system memory 160. The asynchronous schedule may include a plurality of header nodes, where each header node identifies data transfers to one of the plurality of devices 190-199 (each of said devices may have separate header nodes for read operations, write operations and control operations).

In one embodiment, EHCI 130 traverses the asynchronous data transfer list to identify data transfers to execute. In response to identifying no data transfers to execute, EHCI 130 may then determine the operational state of processor 110. In one embodiment, EHCI 130 receives information from power control 140 identifying the operational state of processor 110. EHCI 130 may then execute an extended sleep mode in response to identifying no data transfers to execute and receiving an indication that processor 110 is in a low-power sleep state. EHCI 130 may exit the extended sleep mode in response to receiving an indication from power control 140 that processor 110 is in a non-sleep state (e.g., an operational state).

Figure 2:
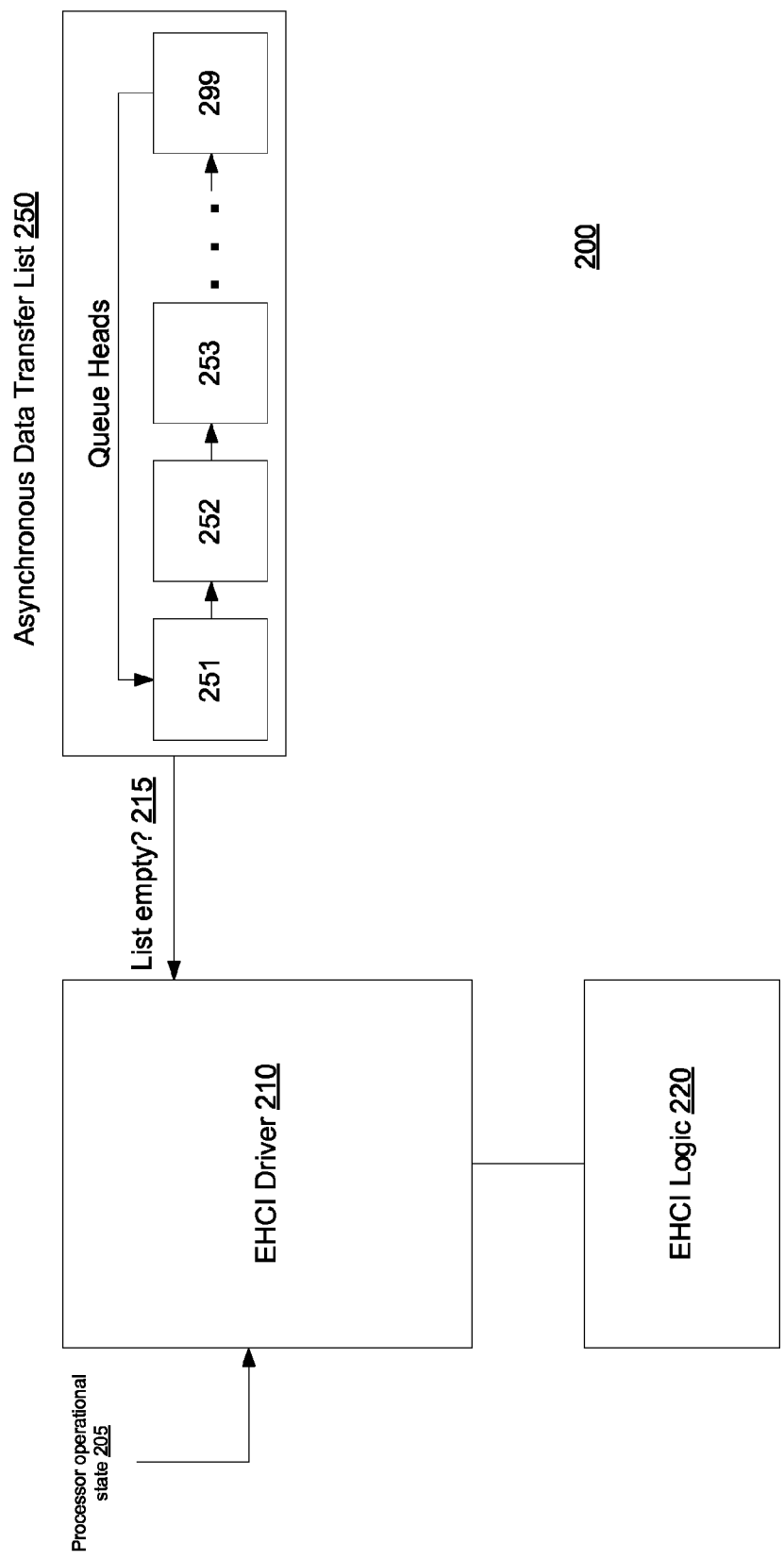
FIG. 2 is a block diagram of an embodiment of the invention.

FIG. 2 is a block diagram of an embodiment of the invention. In this embodiment, EHCI 200 includes EHCI driver 210, EHCI logic 220 and asynchronous data transfer list 250. EHCI driver 210 may be responsible for managing data transfers to USB devices and for determining the operational mode of the EHCI 200. EHCI logic 220 may include routing logic used to deliver data to USB devices.

In one embodiment, asynchronous data transfer list 250 is a circular linked list of schedule work items that provides a round-robin service opportunity for all asynchronous transfers. The schedule work items include queue heads 251-299. Each queue head represents a single bulk or control data transfer corresponding to an endpoint. An endpoint may be a logical entity residing on a USB device requiring service.

It is to be understood that a single USB device may have more than one endpoint. For example, queue heads 251, 252 and 253 may be queue heads for (respectively) read, write and control data for a USB device. Each queue head will point to a list comprising related transactions for a corresponding data transfer.

In one embodiment, EHCI driver 210 traverses asynchronous data transfer list 250 and executes a small number (e.g., one) of transactions associated with one of queue heads 251-299. EHCI driver 210 may continue to traverse asynchronous data transfer list 250 until the lists corresponding to each queue head contain no transactions to execute. When this condition occurs, EHCI driver 210 may receive signal 215 indicating asynchronous data transfer list 250 is empty.

Upon receipt of signal 215, EHCI driver 210 may request signal 205 indicating the operational state of a system CPU. In one embodiment, EHCI driver 210 receives the indication signal 205 from a power control interface.

In response to signal 205 indicating the system CPU is in a sleep state and signal 215 indicating asynchronous data transfer list 250 is empty, an extended sleep mode may be executed by EHCI 200. In this sleep mode, EHCI asynchronous DMA will remain in an extended sleep state so as long as the system CPU remains in a sleep mode. Thus, all USB memory accesses will cease, allowing the system CPU to enter into deeper C-states along with its memory sub-system.

In one embodiment, in response to signal 205 indicating the system CPU is in an operational mode and signal 215 indicating asynchronous data transfer list 250 is empty, EHCI driver 210 may execute a timed sleep mode for EHCI 200. For example, EHCI 200 may be placed in a sleep for a period of 10 µs. After this time period has elapsed, EHCI driver 210 may traverse asynchronous data transfer list 250 to determine if the system has created any new asynchronous DMA transactions to execute. Thus, EHCI 200 still conserves some power in the event that the system CPU is still active by ceasing asynchronous DMA transactions for a period of time.

Figure 3:
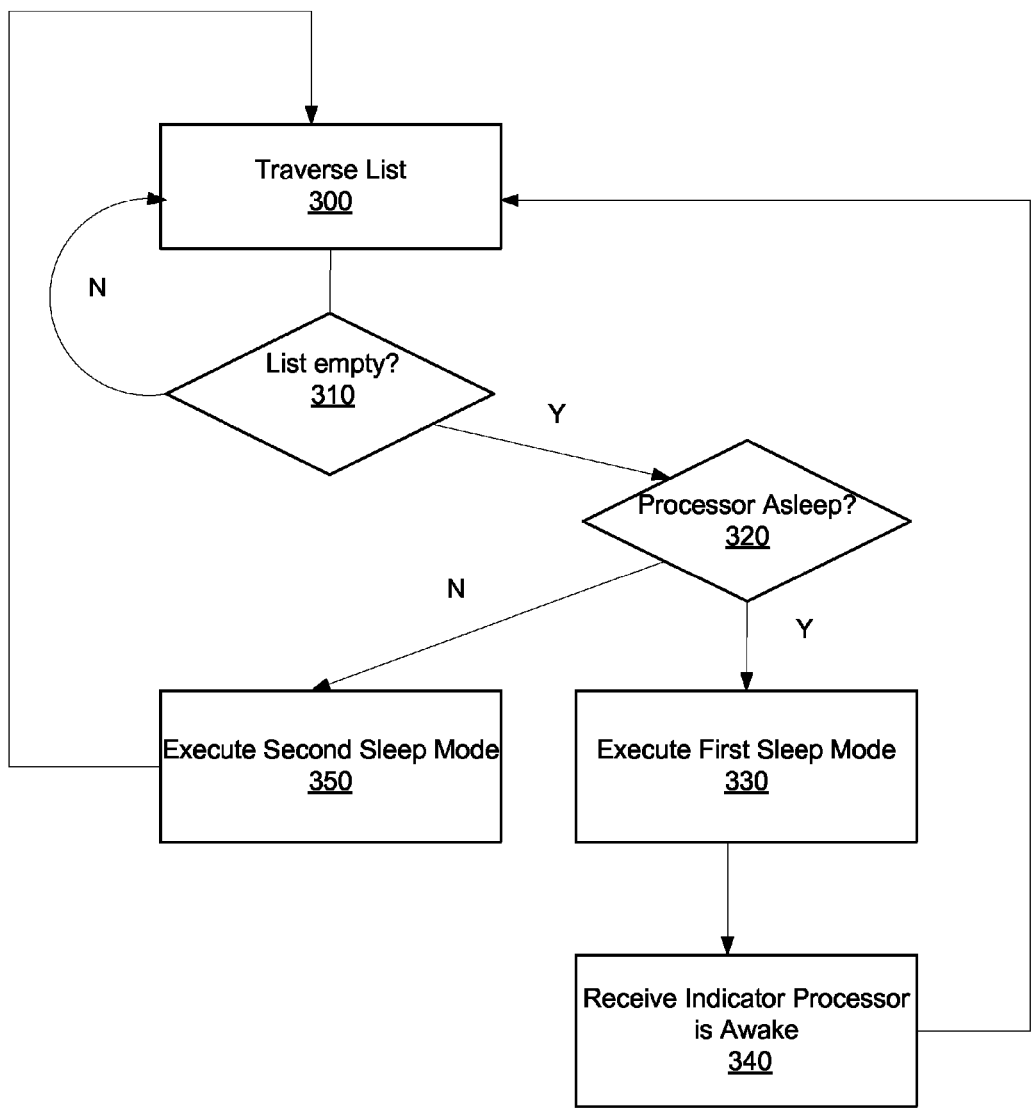
FIG. 3 is a flow diagram of a process utilizing an embodiment of the invention.

FIG. 3 is a flow diagram of a process utilizing an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

An asynchronous data transfer list is traversed to execute data transfers to USB devices, 300. It is to be understood that at long as the asynchronous data transfer list is not empty, asynchronous DMA operations may be executed regardless of the system processor's operational state.

After traversal of the list, a determination is made if the list is empty, 310. If the list is not empty, the circular linked list is again traversed. If the list is empty, then a determination is made regarding the system processor's operational state, 320.

If the system processor is in a sleep state, then the host controller executes a first sleep mode, 330. This first sleep mode is exited only when an indication is received that the system processor is no longer in a sleep state, 340. Upon receiving this indication, the asynchronous data transfer list is re-traversed to determine if there are any asynchronous DMA operations to execute, 300.

Thus, it is to be understood that the system processor operational state determines the first sleep state, rather than the contents of the asynchronous data transfer list. In the event a new asynchronous schedule element has been added to the data transfer list by software, the system processor would have had to enter a non-sleep state to update the asynchronous data transfer list (and thus exiting the aforementioned deep sleep state). The host controller will then exit the first sleep mode to service this newly added task. This first sleep mode is therefore software transparent, and allows significant system power saving sacrificing neither performance nor specification compliance.

If the system processor is not in a sleep state, then a second sleep mode is executed, 350. This sleep mode may be time period based, thus when the time period elapsed, the asynchronous data transfer list is re-traversed to determine if there are any asynchronous DMA operations to execute, 300.

Figure 4:
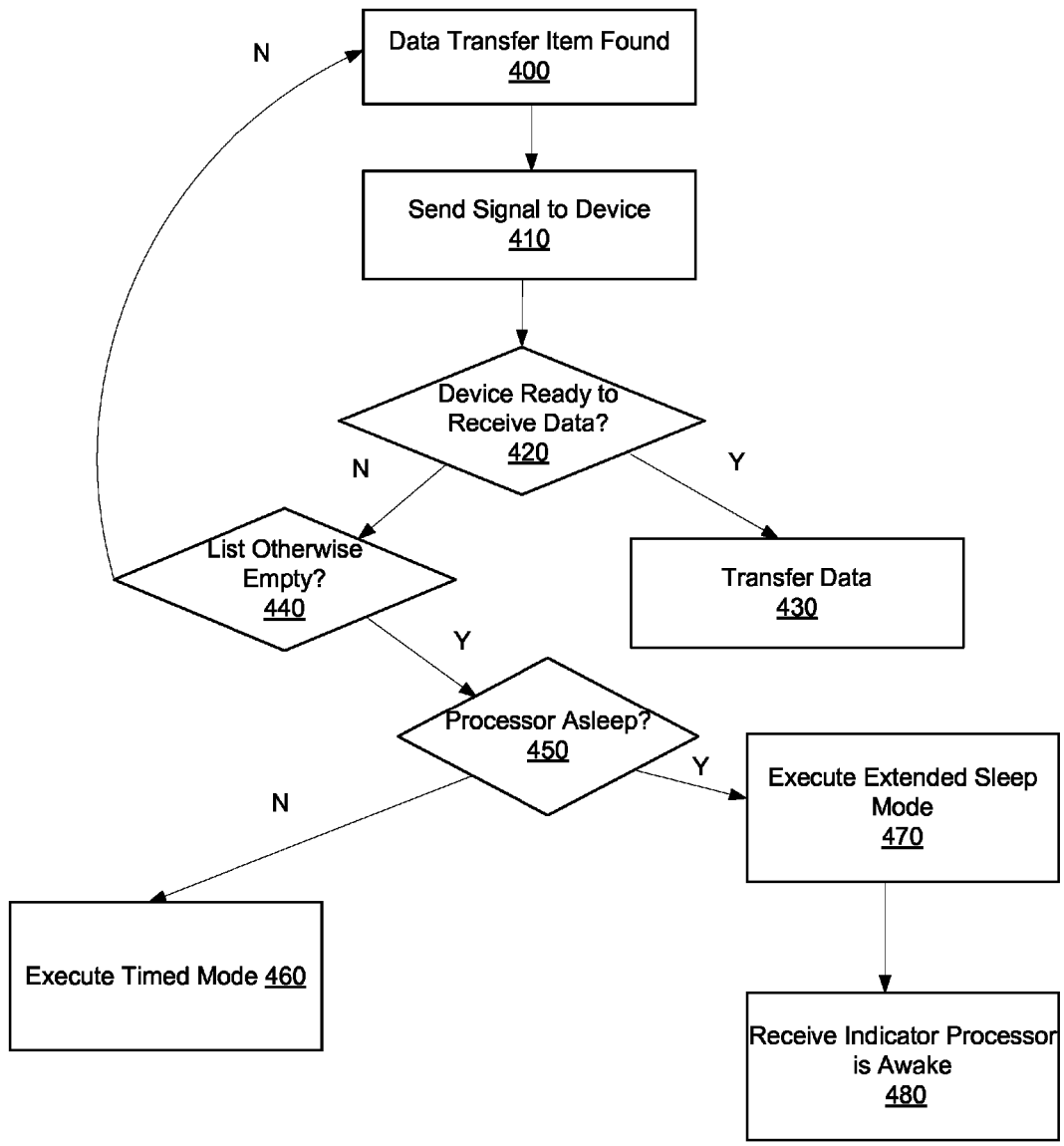
FIG. 4 is a flow diagram of another process utilizing an embodiment of the invention.

FIG. 4 is a flow diagram of another process utilizing an embodiment of the invention. When the asynchronous data transfer list is traversed, and data transfers to an endpoint are found, 400, a host controller may send a signal (e.g., a PING) to determine if the target endpoint is ready to receive data, 410. If the target device is ready to receive data, 420. a data transfer to the USB device is initiated in response to receiving a signal from the USB device acknowledging the first signal, 430.

If the target endpoint is not currently ready to receive data, the endpoint may transmit a not ready (NAK) or a not yet (NYET) signal. In this event, the endpoint will be repeatedly polled at the rate of once per list traversal until the respective data has been delivered (even though the endpoint may NAK/NYET transactions for long periods of time).

If the USB device responds with a NAK/NYET signal, 440, it is then determined if there are other items on asynchronous data transfer list. If there are other items, then the data transfer process begins again, 400. If there are not other data transfers, the host controller may then determine the operational state of the system CPU, 450. If the system CPU is in an operational state, the host controller may execute a sleep mode for a finite period of time, 460. This sleep mode may comprise a short amount of time (e.g., 10 µs).

If the system CPU is in a sleep state, the host controller may execute an extended sleep mode, 470. This extended sleep mode may be the extended sleep mode described above, wherein the host controller leaves the sleep mode when receiving an indication that the system CPU is in an operational state, 480.

In another embodiment, the extended sleep mode described in operation 470 may comprise a sleep mode to be executed for a period of time longer than the sleep mode described in operation 460 (e.g., 100 µs). It is to be understood that this embodiment conserves system power but subsequently polls the USB device to determine if the USB device is ready to receive data. Thus, this embodiment allows asynchronous data transfers to execute if a device becomes ready to receive data after the system processor has entered a non-operational state.

Each of the above operations described by FIG. 3 and FIG. 4 may be executed via logic or modules. Said logic or modules may further be included in a host controller (e.g., a USB host controller).

Various components referred to above as processes, servers, or tools described herein may be a means for performing the functions described. Each component described herein includes software or hardware, or a combination of these. The components can be implemented as software modules, hardware modules, special-purpose hardware (e.g., Application Specific Integrated Circuits (ASICs), Digital Signal Processors (DSPs), etc.), embedded controllers, hardwired circuitry, etc. Software content (e.g., data, instructions, configuration) may be provided via an article of manufacture including a computer storage readable medium, which provides content that represents instructions that can be executed. The content may result in a computer performing various functions/operations described herein. A non-transitory computer readable storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable storage medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

The invention claimed is:

1. A method comprising:
    traversing, via a host controller operatively coupled to at least one device, an asynchronous data transfer list to identify at least one data transfer to the at least one device to execute;
    entering a first sleep mode for the host controller in response to identifying no data transfers to execute and receiving an indication that a processor, operatively coupled to the host controller, is in a sleep state;
    exiting the first sleep mode for the host controller in response to receiving an indication that the processor is in a non-sleep state;
    entering a second sleep mode for the host controller in response to identifying no data transfers to execute and receiving an indication that the processor is in a non-sleep state; and
    exiting the second sleep mode in response to a lapse of a pre-determined time period.

2. The method of claim 1, further comprising:
    sending a first signal to the at least one device in response to identifying, in the asynchronous data transfer list, a data transfer to the at least one device; and
    initiating the data transfer to the at least one device in response to receiving a second signal from the at least one device acknowledging the first signal.

3. The method of claim 2, further comprising:
    entering the second sleep mode for the host controller in response to a plurality of conditions being met, wherein the plurality of conditions includes:
        not receiving the second signal from the at least one device acknowledging the first signal,
        receiving the indication that the processor is in the sleep state, and
        identifying no other data transfers to execute;
    exiting the second sleep mode in response to a lapse of a pre-determined time period; and
    not entering the second sleep mode for the host controller in response to the plurality of conditions not being met.

4. The method of claim 2, further comprising:
    entering the first sleep mode for the host controller in response to a plurality of conditions being met, wherein the plurality of conditions includes:
        not receiving the second signal from the at least one device acknowledging the first signal,
        receiving the indication that the processor is in the sleep state, and
        identifying no other data transfers to execute; and not entering the second sleep mode for the host controller in response to the plurality of conditions not being met.

5. The method of claim 1, wherein receiving the indication that the processor is in the non-sleep state comprises receiving the indication from a power control interface operatively coupled to the host controller.

6. An article of manufacture comprising a non-transitory machine-readable storage medium that provides instructions that, if executed by the machine, will cause the machine to perform operations comprising:
   traversing, via a host controller operatively coupled to at least one device, an asynchronous data transfer list to identify at least one data transfer to the at least one device to execute;
   entering a first sleep mode for the host controller in response to identifying no data transfers to execute and receiving an indication that a processor, operatively coupled to the host controller, is in a sleep state;
   exiting the first sleep mode for the host controller in response to receiving an indication that the processor is in a non-sleep state;
   entering a second sleep mode for the host controller in response to identifying no data transfers to execute and receiving an indication that the processor is in a non-sleep state; and
   exiting the second sleep mode in response to a lapse of a pre-determined time period.

7. The article of manufacture of claim 6, further providing instructions that, if executed by the machine, will cause the machine to perform operations further comprising:
   sending a first signal to the at least one device in response to identifying, in the asynchronous data transfer list, a data transfer to the at least one device; and
   initiating the data transfer to the at least one device in response to receiving a second signal from the at least one device acknowledging the first signal.

8. The article of manufacture of claim 7, further providing instructions that, if executed by the machine, will cause the machine to perform operations further comprising:
   entering the second sleep mode for the host controller in response to a plurality of conditions being met, wherein the plurality of conditions includes:
      not receiving the second signal from the at least one device acknowledging the first signal,
      receiving the indication that the processor is in the sleep state, and
      identifying no other data transfers to execute;
   exiting the second sleep mode in response to a lapse of a pre-determined time period; and
   not entering the second sleep mode for the host controller in response to the plurality of conditions not being met.

9. The article of manufacture of claim 7, further providing instructions that, if executed by the machine, will cause the machine to perform operations further comprising:
   entering the first sleep mode for the host controller in response to a plurality of conditions being met, wherein the plurality of conditions includes:
      not receiving the second signal from the at least one device acknowledging the first signal,
      receiving the indication that the processor is in the sleep state and
      identifying no other data transfers to execute; and
   not entering the second sleep mode for the host controller in response to the plurality of conditions not being met.

10. The article of manufacture of claim 6, wherein receiving the indication that the processor is in the non-sleep state comprises receiving the indication from a power control interface operatively coupled to the host controller.

11. An apparatus comprising:
    a processor to execute a plurality of executable logic of the apparatus, wherein the plurality of executable logic of the apparatus includes:
    logic to traverse an asynchronous data transfer list to identify at least one data transfer to at least one device to execute;
    logic to enter a first sleep mode in response to identifying no data transfers to execute and receiving an indication that a processor is in a sleep state;
    logic to exit the first sleep mode in response to receiving an indication that the processor is in non-sleep state;
    logic to enter a second sleep mode in response to identifying no data transfers to execute and receiving an indication that the processor is in a non-sleep state; and
    logic to exit the second sleep mode in response to a lapse of a pre-determined time period.

12. The apparatus of claim 11, wherein the plurality of executable logic of the apparatus further comprises:
    logic to send a first signal to the at least one device in response to identifying, in the asynchronous data transfer list, a data transfer to the at least one device; and
    logic to initiate the data transfer to the respective device in response to receiving a second signal from the at least one device acknowledging the first signal.

13. The apparatus of claim 12, wherein the plurality of executable logic of the apparatus further comprises:
    logic to enter the second sleep mode for the host controller in response to a plurality of conditions being met, wherein the plurality of conditions includes:
       not receiving the second signal from the at least one device acknowledging the first signal,
       receiving the indication that the processor is in the sleep state, and
       identifying no other data transfers to execute;
    logic to exit the second sleep mode in response to a lapse of a pre-determined time period; and
    logic to not enter the second sleep mode for the host controller in response to the plurality of conditions not being met.

14. The apparatus of claim 12, wherein the plurality of executable logic of the apparatus further comprises:
    logic to enter the first sleep mode for the host controller in response to a plurality of conditions being met, wherein the plurality of conditions includes:
       not receiving the second signal from the at least one device acknowledging the first signal,
       receiving the indication that the processor is in the sleep state and
       identifying no other data transfers to execute; and
    not entering the second sleep mode for the host controller in response to the plurality of conditions not being met.

15. The apparatus of claim 11, wherein receiving the indication that the processor is in the non-sleep state comprises receiving the indication from a power control interface.

16. The apparatus of claim 11, wherein the logic to traverse the asynchronous data transfer list, the logic to enter the first sleep mode and the logic to exit the first sleep mode is included in a Universal Serial Bus (USB) host controller, the USB to couple the processor and the at least one device.

* * * * *